United States Patent Office 3,175,020
Patented Mar. 23, 1965

3,175,020
PRODUCTION OF 4-METHYL-1-PENTENE
John B. Wilkes, Albany, Calif., assignor to California Research Corporation, San Francisco, Calif., a corporation of Delaware
No Drawing. Filed Sept. 15, 1961, Ser. No. 138,249
4 Claims. (Cl. 260—683.15)

This invention relates to a process for the production of 4-methyl-1-pentene by a catalyzed dimerization of propene. More particularly, it relates to the dimerization of propene in the presence of potassium metal disposed upon anhydrous low surface area alumina.

It is known to produce 4-methyl-1-pentene by the dimerization of propene in the presence of dispersed potassium metal and also in the presence of potassium disposed upon an inert support material, for example, potassium carbonate. Alumina is known to interact with sodium metal disposed thereon for attempts to use such catalyst systems for propene dimerization have little or no activity and rapidly deactivate under reaction conditions. Surprisingly, it has now been found that although potassium metal is well-known for its greater chemical reactivity than sodium metal, as evidenced by its higher oxidation-reduction potential, and the like, potassium may be disposed upon specific alumina support materials to yield excellent propene dimerization catalysts capable of prolonged catalyst life in the production of 4-methyl-1-pentene. Thus, the closely related alkali metals perform quite differently in propene dimerization, and certain variations in the nature of the support material, for example, surface area differences, have profound and unpredictable effects upon the nature of the resulting products.

It has now been found that 4-methyl-1-pentene may be produced at elevated temperatures and pressures by contacting propene with potassium metal disposed upon low surface area substantially anhydrous alumina. By low surface area alumina is meant aluminas having surface areas less than 20 square meters per gram of material. Aluminas having surface areas in the range from about 0.01 to 20 square meters per gram are particularly desirable; still more desirable are aluminas having surface areas in the 0.01 to 10 square meter range. By substantially anhydrous alumina is meant alumina which has been freed of bound or absorbed water to the extent which is comparable to that degree of dehydration which is achieved by heating high surface area alumina, e.g., dried aluminas prepared by gel precipitation, and the like, at the alumina-sintering temperatures necessary to reduce the surface areas thereof to less than 20 square meters per gram of alumina. Heating at temperatures of the order of 1900° F. and higher for periods of two to four hours are adequate. Comparable dehydrations may also be achieved when lower temperatures are used for longer periods of time.

The dimerization is conducted in a system, which for all practical purposes is free of molecular oxygen and at temperatures in the range from about 150° F. to 400° F., and at elevated pressures ranging up to 3000 p.s.i.g., and higher, with the preferred operation being in the range from about 150 to 1500 p.s.i.g. The duration of the contacting may vary from a few tenths of a second to as much as twenty hours, depending upon whether the process is continuous or batch.

Not all alumina support materials are satisfactory for use in the present process. High surface area aluminas and aluminas containing even relatively small amounts of heavy metal oxides, such as those of chromium, iron, nickel, molybdenum, and the like, are wholly unsatisfactory. Aluminas containing appreciable amounts of adsorbed or bound water are also unsatisfactory for use in the present process.

High purity, low surface area commercial grade aluminas, e.g., 99+% $Al_2O_3$, may be dried and used as the support material or, as another source, the alumina may be prepared by well-known art methods such as aluminum trihydrate (gel) precipitation in the presence of aqueous ammonia or aqueous alkali followed by water-washing and dehydration at high temperatures. In a preferred treatment, about a 2-hour terminal phase of the dehydration is accomplished by passing an inert anhydrous gas such as nitrogen or helium over the support material while maintaining the elevated temperature.

The alumina support material employed in the present process may vary in size from near colloidal dimensions to pellets of macro dimensions, depending upon the reaction system to be used. For example, in a slurry system, excellent results are obtainable where the support is particulate matter having a diameter of the order of 200 microns and even smaller. For fixed bed operations, it is preferred that the alumina be from about 2 to 10 millimeters and larger in diameter.

Various methods may be used for the disposition of the active component on the alumina support. The metal in the molten state may be contacted by mechanical means with the support under an inert atmosphere, such as nitrogen. The metal in the form of its vapor may also be contacted with and disposed upon the support material under an inert atmosphere. Surprisingly, and very conveniently, for reasons of safety, undispersed molten potassium metal in the presence of an inert hydrocarbon medium under conditions at high speed stirring (e.g., 10,000 r.p.m. and higher) readily wets and adheres to small particle sized alumina, and thus greatly reduces the hazard of flash fires caused by accidental contact of the catalyst with atmospheric oxygen. Suitable inert normally liquid hydrocarbon media include saturated aliphatic hydrocarbons, mono-olefinic aliphatic hydrocarbons, and non-conjugated polyolefinic aliphatic hydrocarbons. Inert aromatic hydrocarbons may also be used as media in catalyst preparation, but these are generally avoided because most aromatic hydrocarbons are not inert to the catalyst under propene dimerization conditions.

The amount of disposed potassium required to produce an active catalyst varies. In terms of parts by weight of support material, at least about 0.01 part of potassium metal is necessary to produce an active catalyst, while as much as about 0.5 part of potassium metal may be used where the support particle size is of the order of 200 microns or less. For the larger support particle sizes, the amount of potassium which may be used may vary from about 0.01 to about 0.2 part.

While potassium is indicated as the active material which is placed upon the support to yield a dispersed potassium on alumina catalyst system, it should be recognized that the active component may also exist in the form of the alkali metal hydride or an organo-metallo derivative. Thus, part or all of the potassium metal may be present in the catalyst composition in the form of the alkali metal hydride, and/or as an organometallo material such as allyl, cyclohexyl, propyl, amyl, and similar alkyls of potassium.

The following examples are intended to be illustrative of the invention herein described, but it is not intended that the examples be limiting as to the invention herein described.

EXAMPLES 1–5

4-methyl-1-pentene was produced by contacting propene with potassium supported upon alumina under the conditions and with the results indicated in Table I, following. The alumina was a commercial grade fused material (aloxite) having a surface area in the range 0.01–1 square meters per gram and a particle size of 1.6 mm. Possible trace amounts of adsorbed water were removed from the alumina by heating it for 30 minutes in air at 600–800° F., followed by further heating in an atmosphere of anhydrous nitrogen. The temperature was then adjusted to about 340° F. whereupon potassium metal in the amount of 1.1 percent by weight of the alumina was added. Efficient stirring of the mixture of melted potassium and heated alumina served to evenly distribute the metal over the support material. Stirring was continued until the temperature of the catalyst was below the boiling point of $n$-heptane, which was then added to serve as a transfer medium. The color of the catalyst was metallic gray to purple. Transfer and use of the catalyst was at all times accomplished in an oxygen and water-free atmosphere.

The reactor was a pressure vessel having a 5 cm. diameter and a 1 liter capacity. The propene feed stream was introduced into the top of the reactor and the product removed at the bottom. (Upflow was also used and found to be effective.) The propene feed was anhydrous and no feed drying section was necessary. However, in view of the cumulative deactivating effect of trace amounts of water, and the like, upon the catalyst, passage of the feed through a molecular sieve-type drying section, or the equivalent, is highly desirable in the practice of this invention. The product stream was stripped of dimer product as liquid condensate in a fractionation stage with the effluent consisting of unconverted propene which was available for recycle to the process.

*Table I*

| Example No | 1 | 2 | 3 | 4 | 5 |
|---|---|---|---|---|---|
| Conditions: | | | | | |
| Temp., °F | 310 | 298 | 333 | 254 | 299 |
| Pressure, p.s.i.g | 887 | 301 | 303 | 898 | 899 |
| Liquid Hourly Space Velocity | 0.378 | 0.190 | 0.171 | 0.189 | 0.331 |
| Conversion, percent | 39.6 | 21.1 | 27.0 | 7.6 | 13.0 |
| Yield, Weight percent: | | | | | |
| Dimer | 95.2 | 93.6 | 92.7 | 96.2 | 96.5 |
| C$_7$H$_{14}$ and Higher | 4.8 | 6.4 | 7.3 | 3.8 | 3.5 |
| Dimer Composition: | | | | | |
| 4-methyl-1-pentene | 67.0 | 48 | 37 | 60 | 52 |
| Other [1] | 33 | 52 | 63 | 40 | 48 |

[1] Mainly 2-methyl-2-pentene and about 10% n-hexene-1.

From the above data it is to be noted that substantial yields of 4-methyl-1-pentene are obtained by contacting propene with potassium disposed upon low surface area alumina. These data indicate temperatures as low as 225° F. and as high as 350° F., and higher, are feasible for 4-methyl-1-pentene production. The above catalyst was used for a period of 46 hours, during which an estimated 65–75 pounds of dimer had been produced per pound of potassium used. From this use, the activity of the catalyst only declined to about one-third the original value.

In direct contrast, catalysts of sodium disposed upon dried alumina were generally inactive in propene dimerizations. Trace propene dimerization activity was noted for sodium disposed upon anhydrous kappa-alumina, but although as much as 9 weight percent of sodium (based upon weight of support used) was used to prepare the catalyst, at 300° F., 1200 p.s.i.g. pressure, and 15 hours reaction time, only a trace amount of dimer was recovered. Similar results were obtained using smaller amounts of sodium on kappa-alumina. When 13 weight percent of sodium was disposed upon alpha-alumina, no detectable propene dimerization occurred. On the other hand, catalysts prepared by disposing potassium upon low surface area aluminas such as dried alpha- and kappa-aluminas, and the like, are effective propene dimerization catalyst systems, yielding predominantly 4-methyl-1-pentene.

EXAMPLE 6

A series of experiments was run using a high surface area alumina (385 square meters per gram) in a stainless steel catalyst testing unit under the conditions indicated below. The alumina support material used was 99+% pure Al$_2$O$_3$, which had been dehydrated in an anhydrous nitrogen gas stream by heating it at a temperature of about 1300° F. for about eight hours. All further treatments, transfers, and the like, were accomplished under inert nitrogen atmospheres. From 5 to 10 weight percent of potassium metal based upon the alumina was disposed upon the support material and the propene was 95% pure (5% propane).

Conditions:
  Temperature, °F. _____ 180–295
  Pressure, p.s.i.g. _____ 900–935
  Liquid hourly space velocity (LHSV) __ 0.37–1.09
  Conversions, percent _____ 12–91

In every case, under the above conditions, and using the above-described alumina support material, the yield of 4-methyl-1-pentene was less than about 1% of the dimer product. These experiments indicate that potassium metal supported upon high surface area alumina is a wholly unsatisfactory system for the production of 4-methyl-1-pentene by propene dimerization.

EXAMPLES 7–12

Except for Example 6, the data listed in the following table was obtained in batch runs carried out in a 630 cc. rocking autoclave using from 30 to 60 cc. of catalyst, 135–145 g. of 96% propene, and 100 cc. of refined white oil. The alumina in every case was 99+% pure, and in some instances was sintered at temperatures in the range from about 1900°–2300° F. in order to vary the surface areas. The reaction temperature was maintained at 300° F., and continued until one-half of the propene had reacted as indicated by the pressure drop in the autoclave, e.g., from about 1200 p.s.i.g. initial pressure to about 600 p.s.i.g. final pressure.

The surface areas listed were obtained by the BET method (H. Brunauer, P. H. Emett and E. Teller), JACS 60, 309 (1938).

*Table II*

ALUMINA SURFACE AREA AND 4-METHYL-1-PENTENE YIELDS

| Example No | 6 | 7 | 8 | 9 | 10 | 11 | 12 |
|---|---|---|---|---|---|---|---|
| Surface Area, m.$^2$/gram | 385 | (<1) | 20 | 0.5 | 13 | 8 | 33 |
| Particle Diameter, mm | .5 | 3 | 0.2 | 0.5 | 0.5 | 3 | 3 |
| Product Distribution, percent: | | | | | | | |
| 4-methyl-1-pentene | 1.4 | 70 | 22 | 85 | 21 | 21 | 3 |
| Other | 98.6 | 30 | 78 | 15 | 79 | 79 | 97 |

From the data of Table II, above, it is to be seen that the product obtained from the substantially anhydrous alumina-supported potassium catalyzed propene dimerizations may be varied by changing the nature of the support. Thus, low surface area alumina, that is alumina having surface areas less than about 20 square meters per gram, are excellent supports for potassium metal in the dimerization of propene to produce 4-methyl-1-pentene.

As will be evident to those skilled in the art, various modifications in this process can be made or found in the light of the foregoing disclosures and discussions without departing from the spirit and scope of the disclosures or from the scope of the claims.

I claim:

1. Process for the production of 4-methyl-1-pentene which comprises contacting propene at elevated pressures and at a temperature in the range from about 150° to 400° F. with a dimerization catalyst consisting essentially of potassium metal disposed upon substantially anhydrous alumina, having a surface area below about 20 square meters per gram and producing a reaction product containing 4-methyl-1-pentene.

2. The process of claim 1, wherein said dimerization catalyst contains from about 0.01 to about 0.5 part of potassium metal per part of said alumina.

3. The process of claim 1, wherein said alumina has a surface area from about 0.01 to 10 square meters per gram.

4. The process of claim 1, wherein said contacting is at a pressure in the range from about 150 to 1500 p.s.i.g.

References Cited by the Examiner

UNITED STATES PATENTS

| 2,952,719 | 9/60 | Appell | 260—683.15 |
| 2,986,588 | 5/61 | Schramm | 260—683.15 |

FOREIGN PATENTS

| 868,945 | 5/61 | Great Britain. |

ALPHONSO D. SULLIVAN, *Primary Examiner.*